United States Patent
Caspi et al.

(10) Patent No.: US 7,317,788 B2
(45) Date of Patent: Jan. 8, 2008

(54) METHOD AND SYSTEM FOR PROVIDING A VOICE MAIL MESSAGE

(75) Inventors: Rami Caspi, Sunnyvale, CA (US); Andrew Mason, Sunnyvale, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 64 days.

(21) Appl. No.: 10/763,884

(22) Filed: Jan. 23, 2004

(65) Prior Publication Data

US 2005/0163289 A1 Jul. 28, 2005

(51) Int. Cl.
*H04M 11/06* (2006.01)

(52) U.S. Cl. .............. 379/88.13; 379/201.01; 704/235; 709/204

(58) Field of Classification Search ........... 379/88.13, 379/88.14, 201.01; 455/413; 704/235; 709/204
See application file for complete search history.

(56) References Cited

U.S. PATENT DOCUMENTS

| | | | |
|---|---|---|---|
| 5,479,411 A | 12/1995 | Klein | |
| 5,557,659 A | 9/1996 | Hyde-Thomson | |
| 5,675,507 A | 10/1997 | Bobo, II | |
| 5,689,550 A | 11/1997 | Garson et al. | |
| 5,712,901 A | 1/1998 | Meermans | |
| 5,870,454 A | 2/1999 | Dahlén | |
| 5,943,398 A | 8/1999 | Klein et al. | |
| 5,991,365 A | 11/1999 | Pizano et al. | |
| 6,075,844 A | 6/2000 | Goldberg et al. | |
| 6,085,231 A | 7/2000 | Agraharam et al. | |
| 6,173,259 B1 * | 1/2001 | Bijl et al. ................ | 704/235 |
| 6,360,252 B1 | 3/2002 | Rudy et al. | |
| 6,389,114 B1 | 5/2002 | Dowens et al. | |
| 6,483,899 B2 | 11/2002 | Agraharam et al. | |
| 6,507,643 B1 | 1/2003 | Groner | |
| 6,563,912 B1 | 5/2003 | Dorfman et al. | |
| 6,587,871 B1 | 7/2003 | Schrader | |
| 6,654,448 B1 * | 11/2003 | Agraharam et al. ..... | 379/88.14 |
| 6,697,474 B1 * | 2/2004 | Hanson et al. ......... | 379/201.01 |
| 2002/0062345 A1 * | 5/2002 | Guedalia et al. ........... | 709/204 |
| 2003/0187650 A1 | 10/2003 | Moore et al. | |
| 2004/0151284 A1 * | 8/2004 | Adamczyk ............. | 379/88.13 |
| 2005/0136896 A1 * | 6/2005 | Ward et al. .............. | 455/413 |

* cited by examiner

*Primary Examiner*—Gerald Gauthier

(57) ABSTRACT

Embodiments provide a system, methods, apparatus, means, and computer program code for providing a voice mail message.

16 Claims, 11 Drawing Sheets

200

```
┌─────────────────────────────────────────────┐
│                                             │
│   RECEIVE A VOICE MAIL MESSAGE FOR A RECIPIENT │
│                                             │
│                                        202  │
└─────────────────────────────────────────────┘
                      │
┌─────────────────────────────────────────────┐
│                                             │
│      CONVERT THE VOICE MAIL MESSAGE TO      │
│              A TEXT FILE                    │
│                                        204  │
└─────────────────────────────────────────────┘
                      │
┌─────────────────────────────────────────────┐
│                                             │
│    DETERMINE AN INSTANT MESSAGE ADDRESS     │
│        ASSOCIATED WITH THE RECIPIENT        │
│                                        206  │
└─────────────────────────────────────────────┘
                      │
┌─────────────────────────────────────────────┐
│                                             │
│  PROVIDE THE TEXT FILE AND THE ADDRESS TO AN INSTANT │
│               MESSAGE SYSTEM                │
│                                        208  │
└─────────────────────────────────────────────┘
```

```
RECEIVE A VOICE MAIL MESSAGE FOR A RECIPIENT
                                                202

CONVERT THE VOICE MAIL MESSAGE TO
AN INSTANT MESSAGE
                                                222

DETERMINE AN INSTANT MESSAGE ADDRESS
ASSOCIATED WITH THE RECIPIENT
                                                206

SEND THE INSTANT MESSAGE TO
THE ADDRESS
                                                224
```

```
RECEIVE A VOICE MAIL MESSAGE FOR A RECIPIENT
                                              202

CONVERT THE VOICE MAIL MESSAGE TO
AN EMAIL TEXT MESSAGE
                                              252

DETERMINE AN EMAIL ADDRESS
ASSOCIATED WITH THE RECIPIENT
                                              254

SEND THE EMAIL MESSAGE TO
THE EMAIL ADDRESS
                                              256
```

```
┌─────────────────────────────────────────────┐
│                                             │
│  RECEIVE A VOICE MAIL MESSAGE FOR A RECIPIENT│
│                                         202 │
└─────────────────────────────────────────────┘
                      │
┌─────────────────────────────────────────────┐
│  DETERMINE IF THE RECIPIENT IS AVAILABLE TO │
│  RECEIVE AN INSTANT MESSAGE                 │
│                                         232 │
└─────────────────────────────────────────────┘
                      │
┌─────────────────────────────────────────────┐
│  CONVERT THE VOICE MAIL MESSAGE TO AN EMAIL │
│  TEXT MESSAGE IF THE RECIPIENT IS NOT       │
│  AVAILABLE TO RECEIVE AN INSTANT MESSAGE    │
│                                         262 │
└─────────────────────────────────────────────┘
                      │
┌─────────────────────────────────────────────┐
│  DETERMINE AN EMAIL ADDRESS                 │
│  ASSOCIATED WITH THE RECIPIENT              │
│                                         254 │
└─────────────────────────────────────────────┘
                      │
┌─────────────────────────────────────────────┐
│  SEND THE EMAIL MESSAGE TO                  │
│  THE EMAIL ADDRESS                          │
│                                         256 │
└─────────────────────────────────────────────┘
```

FIG. 9

METHOD AND SYSTEM FOR PROVIDING A VOICE MAIL MESSAGE

FIELD

The embodiments described herein relate to a method, system, means and computer code for providing a voice mail message.

BACKGROUND

The increasing popularity of communication tools such as instant messaging, email, SMS (short message service), paging, etc. has changed the way that people communicate. Unfortunately, in some situations some communication systems may be unusable. For example, while participating in meeting, a person may want to determine if he has any voice mail messages or otherwise be able to receive his voice mail messages. Unfortunately, listening to a voice mail message may be disturbing to other participants in the meeting or may look impolite.

As such, there is a need for a system, method, apparatus, means, and computer program code for providing a voice mail message to a recipient via one or more other forms of electronic communication.

SUMMARY

Embodiments provide a system, method, apparatus, means, and computer program code for providing a voice mail message intended for a recipient to that recipient in an appropriate electronic communication (e.g., instant message, pager message, SMS transmission, email message).

In some embodiments, a person using a user device (e.g., telephone, computer) may create or leave a voice mail message that is received, retrieved or otherwise obtained by a voice mail system or service. The voice mail message may be for a person using or otherwise associated with another user device. The voice mail system may provide an electronic copy of the voice mail message (e.g., a .wav or other audio file) to a voice/text converter, which can create a text or translated message (e.g., a .txt file) from the voice mail message. The voice/text converter then can provide the text message to an instant messaging system or service. The voice/text converter also may provide the voice mail message to an instant messaging system or service, email system or service, or other communication service, which then can send the translated version of the voice mail message to the recipient. For example, if the communication service is an instant message system or service, the instant messaging system then can send or create an instant message and send the instant message to the intended recipient of the original voice mail message. The instant message may include an electronic copy of the original voice mail message (e.g., a .wav file) and/or the text file (e.g., a .txt file) created from the voice mail message. According to some embodiments, the recipient can then choose the most convenient way to receive the message, such as a text message during an on-going meeting.

According to some embodiments, a system includes receipt of a first voice mail message, the first voice mail message being associated with a recipient, conversion of the first voice mail message to an instant message, determination of an instant message address associated with the recipient, and sending the instant message to the address. In some other embodiments, a system may include receipt of a voice mail message, the voice mail message being associated with a recipient, conversion of the voice mail message into a text file, determination of an instant message address associated with the recipient, and provision of the text file and the address to an instant message system. In some further embodiments, a method may include receipt of a voice mail message, the voice mail message being associated with a recipient, determination of whether the recipient is available to receive an instant message, conversion of the voice mail message to an email message if the recipient is not available to receive an instant message, determination of an email address associated with the recipient, and sending the instant message to the email address. Other embodiments may include means, systems, computer code, etc. for implementing some or all of the elements of the methods described herein.

With these and other advantages and features that will become hereinafter apparent, embodiments may be more clearly understood by reference to the following detailed description, the appended claims and to the several drawings attached herein.

BRIEF DESCRIPTION OF THE FIGURES

The accompanying drawings, which are incorporated in and form a part of the specification, illustrate some embodiments.

FIG. 5 is a flowchart of a method in accordance with some embodiments;

FIG. 6 is another flowchart of a method in accordance with some embodiments;

FIG. 8 is another flowchart of a method in accordance with some embodiments;

FIG. 9 is another flowchart of a method in accordance with some embodiments;

DESCRIPTION OF SPECIFIC EMBODIMENTS

Applicants have recognized that there is a market opportunity for systems, means, computer code, and methods that facilitate providing of a voice mail message via another form, such as via an instant message communication, email message, short message service (SMS) transmission, pager signal transmission, etc.

Figure 1:
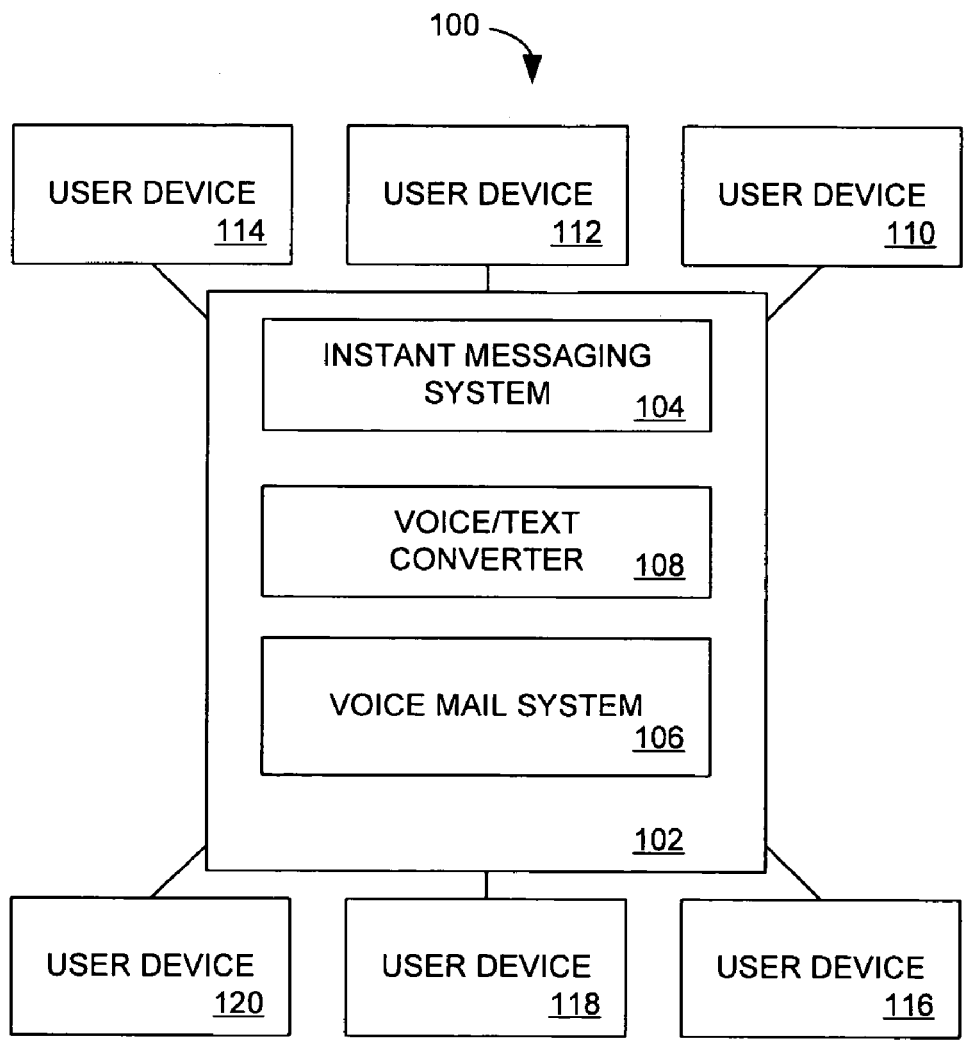
FIG. 1 is a block diagram of a system according to some embodiments.

Now referring to FIG. 1, an exemplary system 100 is illustrated according to some embodiments. The system 100 includes a server, computer, or other device (hereinafter referred to as a server) 102. In some embodiments, the server 102 may include an instant messaging system 104, a voice mail system 106, and a voice/text converter 108. Some or all of the instant messaging system 104 and/or the voice mail system 106 may be external to the server 102, operating on one or more devices separate from the server 102, etc.

The system 100 also may include user devices 110, 112, 114 as well as user devices 116, 118, 120. For purposes of further discussion, the user devices 110, 112, 114 are assumed to be in communication directly or indirectly with the instant messaging system 104 while the user devices 116, 118, 120 are assumed to be in communication directly or indirectly with the voice mail system 108. In some embodiments, a user device may be or include such things as a telephone, cellular telephone, personal digital assistant (PDAs), computer, etc. For example, the user device 110 may be a personal computer implementing the Windows XP™ operating system and the Windows Messenger™ instant messenger system. In addition, the user device 110 may include telephony and other multimedia messaging capability using, for example, peripheral cameras, Webcams, microphones and speakers (not shown) or peripheral telephony handsets. As another example, the user device 116 may be a telephone that can communicate with the voice mail system 106.

In some embodiments, the voice mail system 106 may be or include the ability to receive, obtain, store, manage, etc. voice mail messages provided by users. For example, a person may use the user device 120 to call and leave a voice mail message that is stored at or obtained by the voice mail system 106. The voice mail system 106 may be able store voice mail messages in analog and/or digital format.

The voice mail system 106 may be part of, connected to, or in communication with a larger telephone system, switch, or network. For example, in some embodiments, the voice mail system 106 may be part of a communication network that allows the user device 120 to call or otherwise communicate with the user devices 116, 118.

In some embodiments, the voice mail system 106 may, or may be able to, receive, retrieve or otherwise obtain voice mail messages from other sources, such as a database, telephone system, computer network, or other voice mail system. The messages may be received in either digital and/or analog format. The voice mail system 106 may have or have access to one or more electronic voice mail boxes, databases, etc. for storing or accessing voice mail messages.

In some embodiments, the instant messaging system 104 may be or include the ability to receive, obtain, store, manage, etc. instant messages provided, sent, or generated by users. For example, a person may use the user device 120 to send an instant message via the instant messaging system 104.

In some embodiments, the instant messaging system 104 may be part of, connected to, or in communication with a larger communication network. For example, in some embodiments, the instant messaging system 104 may be part of a communication network that allows a person using the user device 110 to send an instant message to the people using the user devices 112, 114.

In some embodiments, the instant messaging system 104 may, or may be able to, receive, retrieve or otherwise obtain instant messages from other sources, such as a database, computer network, or other instant message system.

In some embodiments, the instant messaging system 104 may include or be in communication with a presence and/or availability service. The presence and/or availability service may be or include an application that monitors or detects the presence and availability of devices, people, etc. The instant messaging system 104 may register with a presence and/or availability service or establish one or more identities that register with a presence and/or availability service.

The voice/text converter 108 may convert voice mail messages and/or audio files (e.g., .wav files) to text and may include a speech or voice recognition capability or hardware/software providing such functionality. The voice/text converter can create a file by converting a voice or speech message or other sample into representative text or otherwise translating a voice or speech message or other sample into a text or written message or sample.

In some embodiments, the voice/text converter 108 also may be able to convert a text or written message or sample into an audio file by using a text to speech function. That is a text or written message may be converted into a voice message, audio file or message, etc. by the voice/text converter 108.

In some embodiments, the server 102 may include other hardware and/or software components and/or devices such as, for example, applications, operating system, databases, communication ports, input devices, output devices, storage devices, processors, caller identification applications or capabilities, automatic number identification applications or capabilities, etc.

In some embodiments, the system 100 may include other hardware and/or software components and/or devices such as, for example, gateways, proxy servers, registration servers, presence servers, redirect servers, databases, database servers, applications, communication networks, etc.

As will be discussed in more detail below, in some embodiments, a person using a user device (e.g., the user device 120) may create or leave a voice mail message that is received, retrieved or otherwise obtained by the voice mail system 106. The voice mail message may be for a person using or otherwise associated with another user device (e.g., the user device 112). The voice mail system 120 may provide an electronic copy of the voice mail message (e.g., a .wav or other audio file) to the voice/text converter 108, which can create a text message (e.g., a .txt file) from the voice mail message. The voice/text converter 108 then can provide the text message to the instant messaging system 104. The voice/text converter 108 also may provide the voice mail message or audio file to the instant messaging system 104. The instant messaging system 104 then can send or create an instant message and send the instant message to the intended recipient of the original voice mail message. The instant message may include an electronic copy of the original voice mail message (e.g., a .wav file) and/or the text file (e.g., a .txt file) created from the voice mail message.

The voice mail system 106 may determine who the original recipient of the voice message was. The voice mail system 106 then may pass a code or other identifier associated with this recipient to the instant messaging system 104. The instant messaging system 104 can use the recipient identifier's to determine an address to send the instant message to and/or to determine if the recipient is currently online or otherwise available to receive an instant message communication.

In some embodiments, the server 102 may be able to determine what telephone numbers from which callers leaving voice mail messages are dialing. For example, the voice mail system 106 or the server 102 may have automatic number identification or caller identification capabilities. In addition, in some embodiments, the server 102 may have or have access to a database or other resource that the server 102 can use to associate the telephone numbers with one or more specific people. The server 102 may provide the caller or calling number information associated with a voice mail message along with the translation of the voice mail message.

Figure 2:
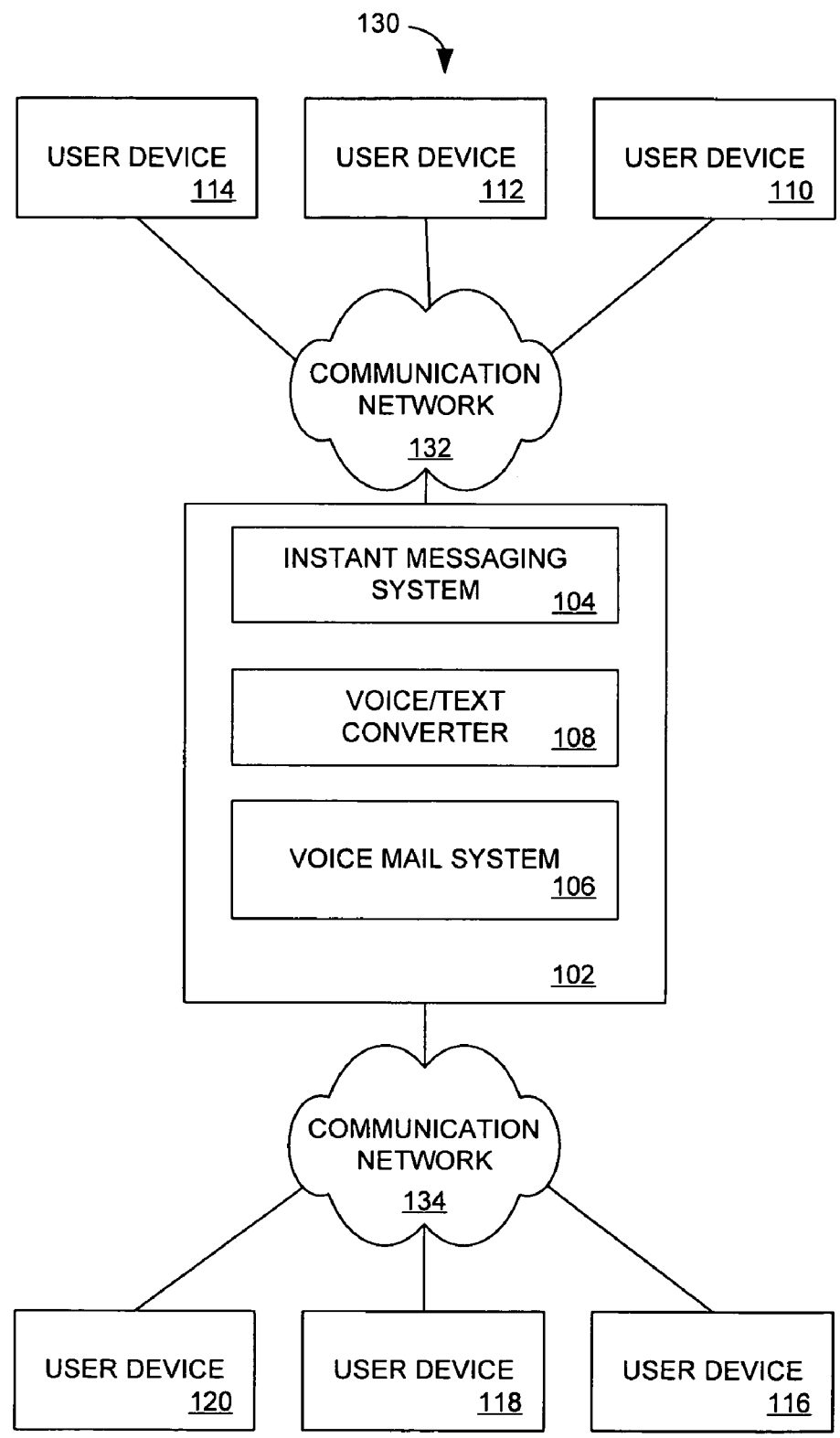
FIG. 2 is another block diagram according to some embodiments.

Now referring to FIG. 2, another exemplary system 130 is illustrated in accordance with some embodiments. The system 130 includes the server 102, instant messaging system 104, voice mail system 106, voice/text converter 108, band user devices 110, 112, 114, 116, 118, 120 previously discussed above. The instant messaging system 104 may communicate with the user devices 110, 112, 114 via a communication network 132 while the voice mail system 106 may communicate with the user devices 116, 118, 120 via a communication network 134. In some embodiments, the communication network 132 may be the same as the communication network 134 or the communication networks 132, 134 may be part of or included in the same communication network.

In some embodiments, the network 132 and/or the network 134 may be or include the Internet, a VPN (virtual private network), the World Wide Web, a local area network, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 132 or the network 134 may be implemented using a TCP/IP network and/or may implement voice or multimedia over IP using, for example, the Session Initiation Protocol (SIP).

Figure 3:
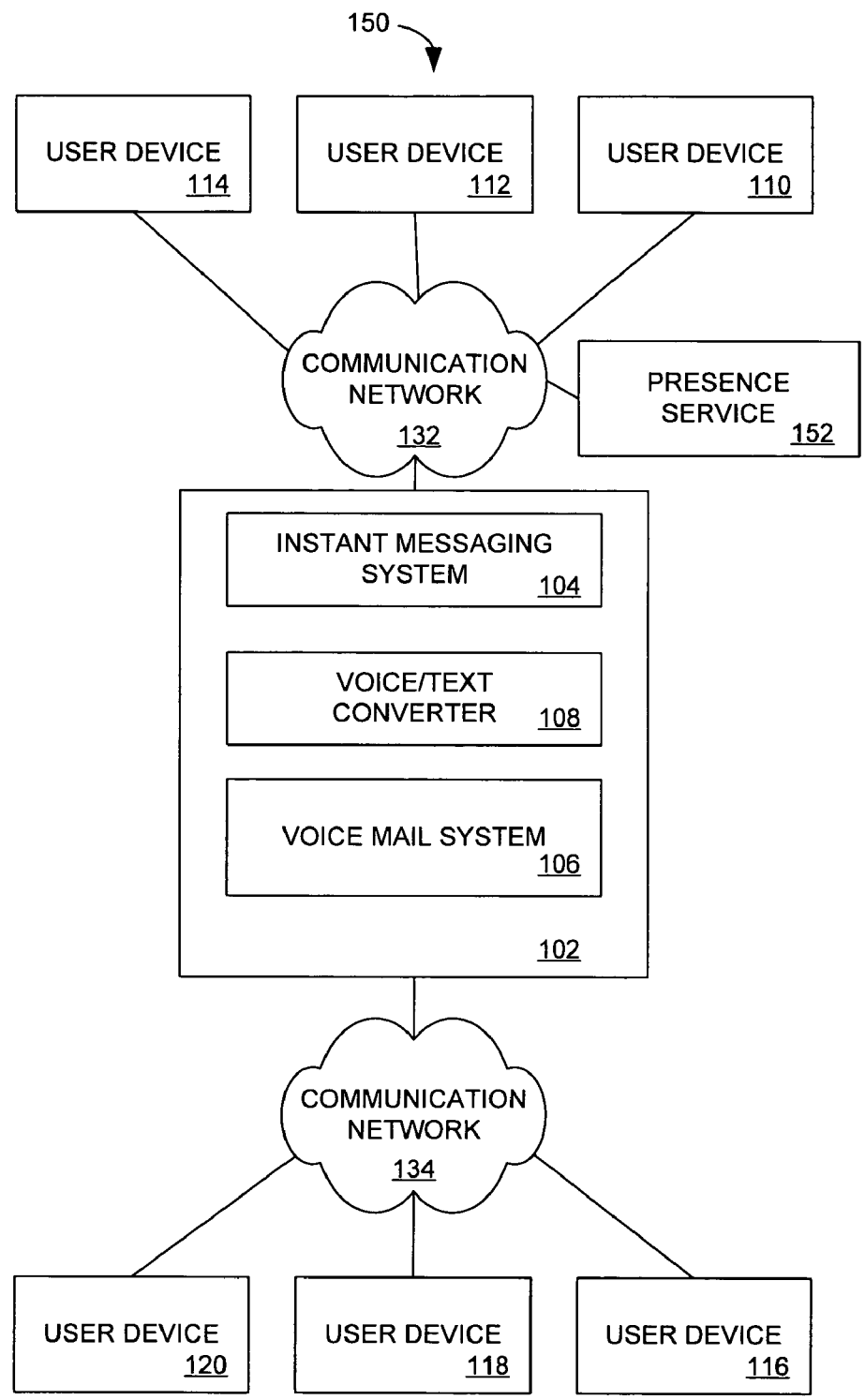
FIG. 3 is another block diagram according to some embodiments.

In some embodiments, a system 150 may include a presence service 152 connected to the communication network 132 and/or in communication with the instant messaging system 104, as illustrated in FIG. 3. The system 150 includes the server 102, instant messaging system 104, voice mail system 106, voice/text converter 108, and user devices 110, 112, 114, 116, 118, 120 previously discussed above.

The presence service 152 may monitor the presence or availability of people using the user devices 110, 112, 114 and store, make known, or provide presence information regarding such people and/or devices. Thus, when people are online or are available online using the devices 110, 112, 114, the presence service 152 may monitor, receive information about, or detect their presence. The presence service 152 may provide such information to the instant messaging system 104 upon request, periodically, when a change in presence status occurs, or in accordance with some other plan or procedure. The instant messaging system 104 may register as one or more entities with the presence service 152 to receive presence status change notifications in order to send messages to and/or receive messages from, one or more users using or associated with the user devices 110, 112, 114.

Figure 4:
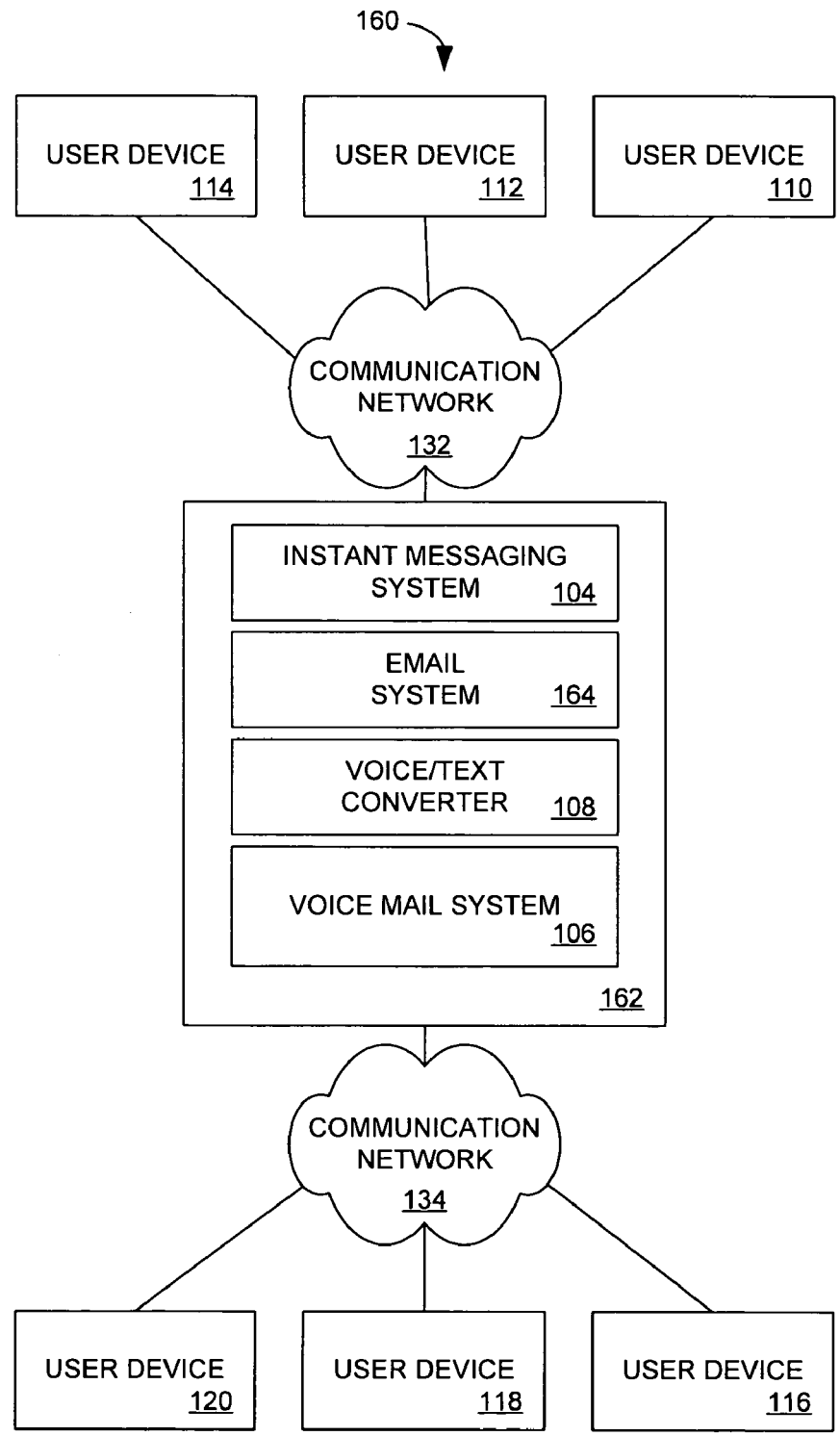
FIG. 4 is another block diagram according to some embodiments.

In some embodiments, a system 160 may use or include an email system 162 in addition to, or as an alternative to, the instant messaging system 104, as illustrated in FIG. 4. The system 160 includes the server 102, instant messaging system 104, voice mail system 106, voice/text converter 108, user devices 110, 112, 114, 116, 118, 120, and communication networks 132, 134 previously discussed above.

In a manner similar to the instant messaging system 104, the email system 164 may receive a text file from the voice/text converter 108 that is a conversion from a voice mail message. The email system 164 or some other part of the server 102 may determine the email address for the intended recipient of the voice mail message and send an email message to the appropriate email address. The email message may include an electronic copy of the original voice mail message (e.g., a .wav file) and/or the text file (e.g., a .txt file) created from the voice mail message. In some embodiments, the server 102 may store or have access to a database or other electronic resource that stores or has email addresses for one or more potential recipients. In some embodiments, the server 102 may first try to send an instant message to an intended recipient of a voice mail message. If the recipient is not online or is otherwise unavailable, the server 102 then may try to send the email message. In other embodiments, other types of messaging systems might be used, such as short message service (SMS), pager systems, etc. The appropriate messaging method (e.g., instant messaging, e-mail, SMS, etc.) may be determined based on the presence and availability information of the recipient of the original voice mail.

Process Description

Reference is now made to FIG. 5, where a flow chart 200 is shown which represents the operation of a specific embodiment. The particular arrangement of elements in the flow chart 200 is not necessarily meant to imply a fixed order to the elements; embodiments can be practiced in any order that is practicable.

Processing begins at 202 during which the server 102 receives a voice mail for an intended recipient. Thus, the voice mail message is associated with the recipient, even though the recipient has not yet heard the voice mail message. As previously discussed above, in some embodiments a person using a telephone or other user device (e.g., the user device 118) may leave or provide a voice mail message directly or indirectly to the voice mail system 106. In other embodiments, the voice mail system 106 may receive, retrieve, or otherwise obtain a file or other electronic communication that includes the voice mail message (e.g., a .wav file retrieved from a database, an audio file transmitted to the voice mail system 106 from another device). The voice mail system 106 may examine a user configuration database to determine whether the recipient user wishes to receive his/her voice mail messages as text messages.

During 204, the server 102 translates or otherwise converts the voice mail message to a text file. In some embodiments, the voice/text converter 108 may do the conversion of the voice mail message to a text file or other written message. In some embodiments, the voice mail system 106 may provide the voice mail message to the voice/text converter 108. In other embodiments, the voice mail system 106 may indicate to the voice/text converter 108 that a voice mail message exists. The voice/text converter 108 then may retrieve the voice mail message or request that the voice mail system 106 send it the voice mail message.

During 206, the server 102 identifies or otherwise determines an instant message address associated with the intended recipient of the voice mail message. In some embodiments, 206 may occur prior to 204. In some embodiments, if no address can be found for the intended recipient or if the recipient is not currently online and available, the server 102 may wait until such time as the recipient is online and available and an address for the recipient is found before the server 102 conducts 204.

In some embodiments, the server 102 may maintain or have access to a database, buddy list, or other resource of address information. For example, a database may keep information associating a recipient's instant message address with the telephone number associated with the voice mail message. The telephone number also may be associated with the recipient. The server 102 can access and use this database to find an instant message address for the recipient after a voice mail message is left that is directed to the particular telephone number.

During 208, the server 102 sends or otherwise provides the text file and the address associated with the recipient to an instant message system, such as the instant messaging system 104 or an instant message system external to the server 102. In some embodiments, the server 102 also may send a digital file or version of the voice mail message along with the text file and the address.

In some embodiments, the server 102 may determine first if the recipient is online or otherwise available to receive an instant message before sending the text file and/or recipient address to the instant message system. Thus, sending the instant message to the instant message address associated with the recipient may be delayed until the recipient is online or otherwise is available or able to receive an instant message. If the recipient is not online or otherwise is unable or unavailable to receive an instant message transmission, the server 102 may send an email message or other electronic communication to the recipient instead. In addition to sending an instant message, in some embodiments the server 102 also may send an email message, SMS transmission, and/or some other sort of electronic communication.

In some embodiments, the method 200 or other methods disclosed herein may include the server 102 or the instant messaging system 104 receiving an instant message. The instant message may include a text portion. The server 102 (e.g., the voice/text converter 108) can convert the text message into an audio or electronic voice file or message. The server 102 or the voice mail system 106 then may provide the audio or voice mail file or message to a designated party (which can be done by providing the message or file to a telephone number associated with the party). For example, if the second instant message is in response or reply to an initial instant message sent by the server 102 to a recipient, wherein the initial instant message included a translated voice mail message associated with a particular party or telephone number, the server 102 may provide the translation of the second instant message to the party or telephone number.

As another example, if the second instant message includes a telephone number, party name, or other identifier, the server 102 may provide the translation of the second instant message to the indicated party or telephone number. As indicated in these examples, in some embodiments, the method 200 may include receiving a second instant message, the second instant message including a text message, converting the second instant message into a second voice mail message, and providing the second voice mail message to a party associated with the first voice mail message or to another party indicated in the second instant message. This represents bidirectional communication with an appropriate translation between audio (voice) and text (IM). One or more people can be associated with a telephone number, so providing a voice mail to a telephone number also implements providing the voice mail to the one or more people.

As will be discussed in more detail below, in some embodiments, the method 200 may include receiving a command from a recipient regarding one or more voice mail messages, sending data indicative of a calling telephone or party number associated with a voice mail message, sending data indicative of a voice mail message's length of time, and sending data indicative of a number of voice mail messages associated with a recipient. Such additional data may be sent in an instant message separate from the instant message that includes the translation of the voice mail message, in the same instant message as the translation of the voice mail message, or in one or more separate instant messages.

Reference is now made to FIG. 6, where a flow chart 220 is shown which represents the operation of a specific embodiment. The particular arrangement of elements in the flow chart 220 is not meant to imply a fixed order to the elements; embodiments can be practiced in any order that is practicable.

The method 220 includes 202 and 206 previously discussed above. In addition, after 202, the server 102 creates an instant message from the voice mail message during 222. For example, the server 102 may translate an audio file representing the voice mail message into a text message or file and then use the text message or file in an instant message, which may be adding the text message or file as an attachment to the instant message.

Figure 7:
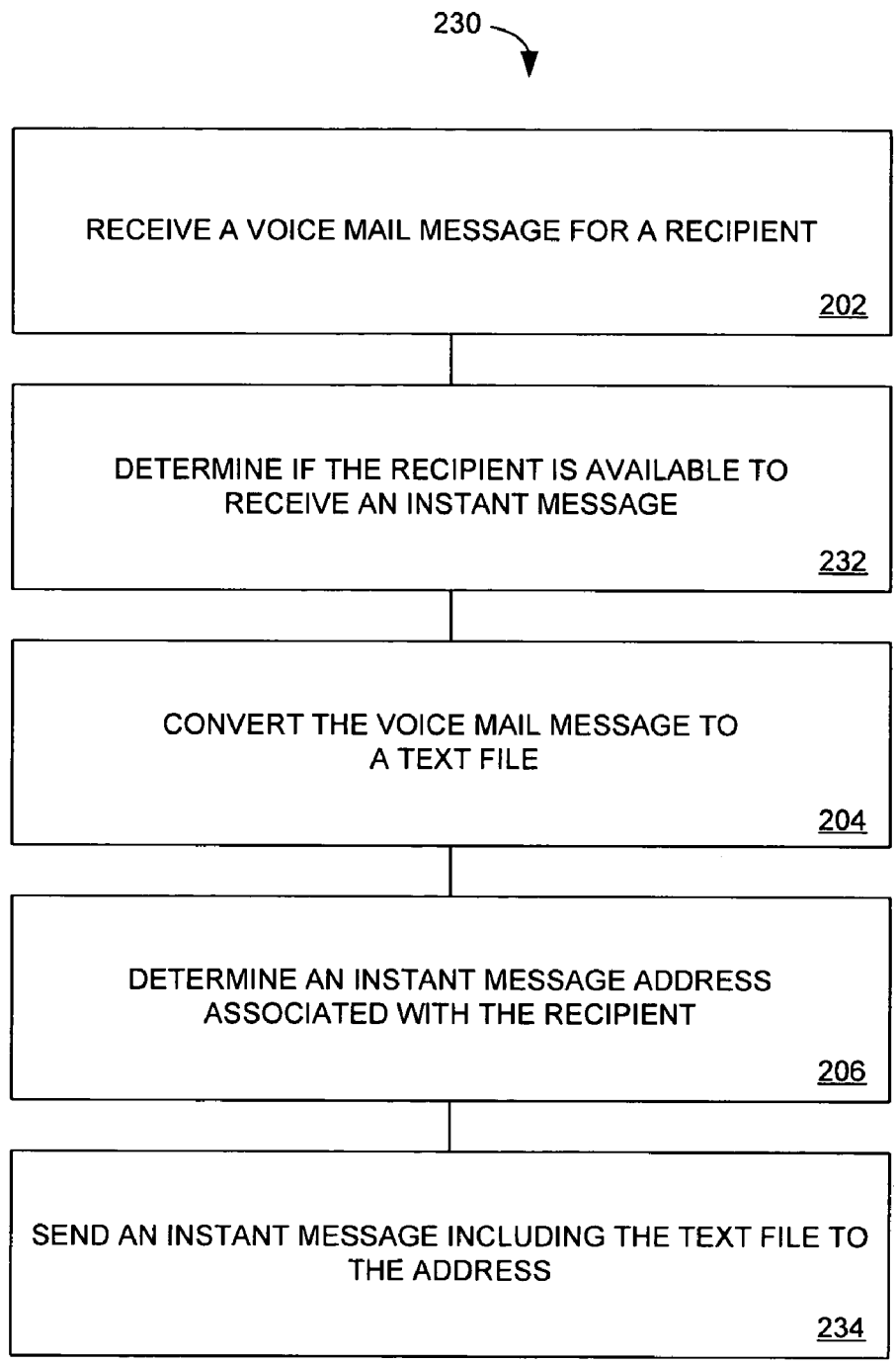
FIG. 7 is another flowchart of a method in accordance with some embodiments.

During 224, the server 102 sends the instant message directly or indirectly to the address determined during 206. In some embodiments, the server 102 may determine first if the recipient is online or otherwise available to receive an instant message before sending the instant message Reference is now made to FIG. 7, where a flow chart 230 is shown which represents the operation of a specific embodiment. The particular arrangement of elements in the flow chart 230 is not meant to imply a fixed order to the elements; embodiments can be practiced in any order that is practicable.

The method 230 includes 202, 204, 206 previously discussed above. In addition, after 202 the server 102 determines if the intended recipient of the voice mail message is available to receive an instant message during 232. For example, the server 102 may query a presence service, database, registration service or device, etc. to determine if the recipient is online or otherwise can receive an instant message. In some embodiments, the server 102 may receive or retrieve information regarding the presence or other availability of one or more people to receive an instant message. In some embodiments, determining an address associated with the recipient during 206 may occur as part of 232.

During 234, the server 234 sends an instant message that includes the text file created during 204 to the address determined during 206. For example, the server 102 may translate an audio file representing the voice mail message into a text message or file and then use the text message or file in an instant message, which may include adding the text message or file as an attachment to the instant message.

Reference is now made to FIG. 8, where a flow chart 250 is shown which represents the operation of a specific embodiment. The particular arrangement of elements in the flow chart 250 is not meant to imply a fixed order to the elements; embodiments can be practiced in any order that is practicable.

The method 250 includes 202 previously discussed above. In addition, after 202 the server 102 converts the voice mail message to an email message during 252. For example, the server 102 may translate an audio file representing the voice mail message into a text message or file and then use the text message or file in an email message, which may include adding the text message or file as an attachment to the email message.

During 254, the server 102 determines an email address associated with the intended recipient of the voice mail message. In some embodiments, 254 may occur prior to 252. In some embodiments, if no address can be found for the intended recipient or if the recipient is not currently able to receive an email message, the server 102 may wait until such time as the recipient is able or available to receive an email message before the server 102 conducts 252.

In some embodiments, the server 102 may maintain or have access to a database, list or other resource of address information. For example, a database may keep information associating a recipient's email address with the telephone number associated with the voice mail message. The telephone number also may be associated with the recipient. The server 102 can access and use this database to find an email address for the recipient after a voice mail message is left that is directed to the particular telephone number.

During 256, the server 102 sends the email message directly or indirectly to the email address determined during 254.

Reference is now made to FIG. 9, where a flow chart 260 is shown which represents the operation of a specific embodiment. The particular arrangement of elements in the flow chart 260 is not meant to imply a fixed order to the elements; embodiments can be practiced in any order that is practicable.

The method 260 includes 202, 232, 254, 256 previously discussed above. In addition during 262, the server 102 converts the voice message to an email text message if the recipient is not available to receive an instant message. Thus, in the method 260, the server 102 may first try to send an instant message indicative of the voice mail message to the recipient. If the recipient is offline or is otherwise unable or unavailable to receive an instant message, the server 102 then will try to send an email message to the recipient, the email message being indicative of the voice mail message. In other embodiments, other types of messages may be sent instead of an instant message or email message, such as an SMS transmission or message, a pager message, a text message delivered to a cellular telephone, etc.

In some different embodiments, each of the different methods described above many include variations described in relation to other embodiments.

Figure 10:
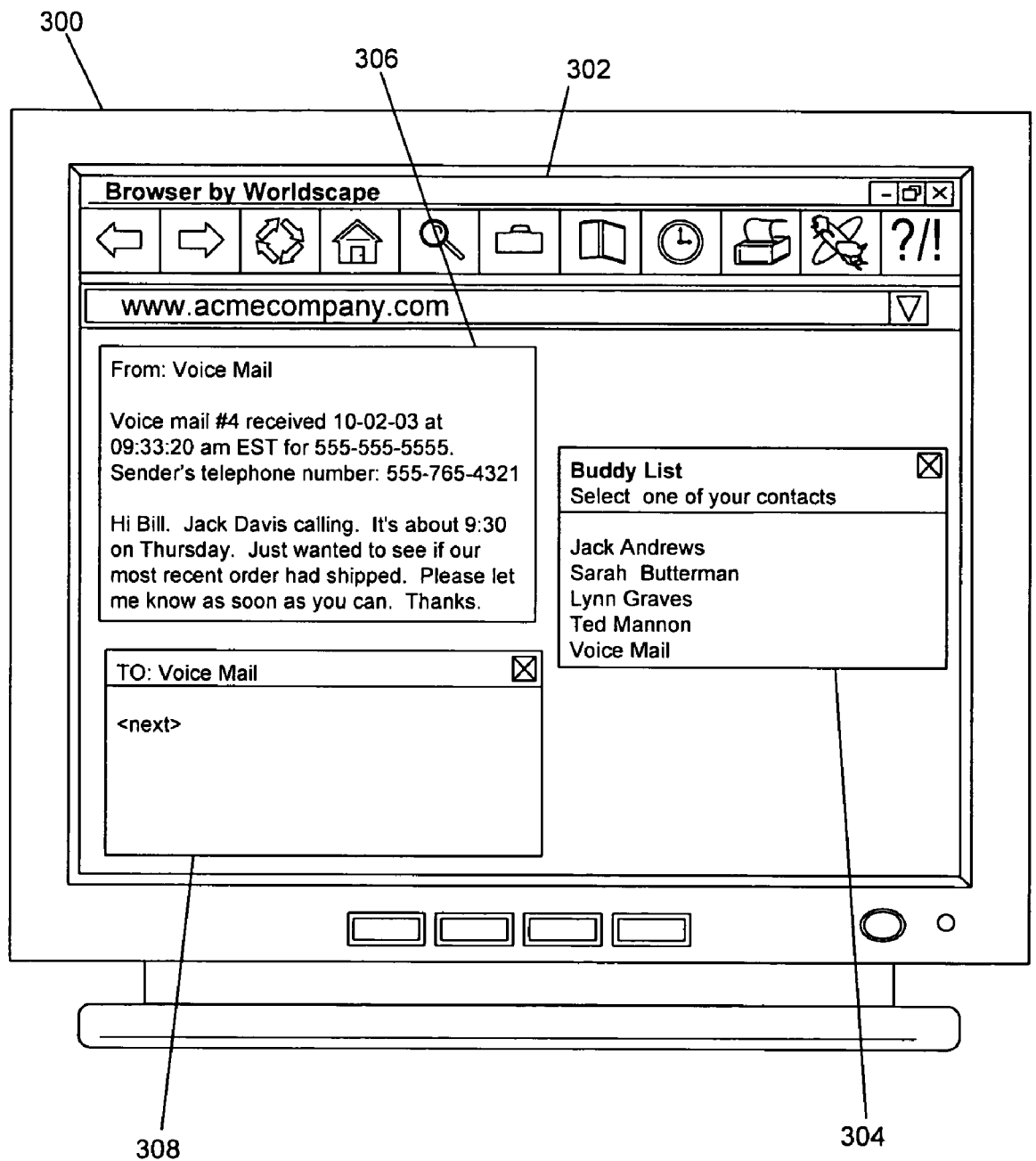
FIG. 10 is a block diagram of a representative interface according to some embodiments.

Reference is now made to FIG. 10. In some embodiments a user device (e.g., the use device 112) may include a monitor or display 300 on which a browser or other interface 302 is operating. A user may be able to display numerous windows regarding instant messages, email messages, or other communications. For example, in some embodiments, a user may be able to display a buddy list window 304. The buddy list may include a list of names (e.g., "Jack Andrews", "Lynn Graves") or other identifiers (e.g., "Voice Mail"). The window 304 may indicate which of the listed names or identifiers is online or otherwise available to receive an instant message communication. The identifier "Voice Mail" in the window 304 may be indicative that the instant messaging system 104 or the server 102 is registered with a presence service or is otherwise online or available to receive an instant message.

The window 306 is representative of an instant message received from the instant messaging system 104 or the server 102 and may be indicative of a voice mail message received on Oct. 2, 2003, at 9:33 am for the telephone number 555-555-5555. Pursuant to the methods and systems described above, the server 102 may convert the voice mail message into a text message and use the text message in or as part of an instant message sent from "Voice Mail" to the voice mail recipient, as indicated in the window 306 (i.e., "Hi Bill. Jack . . . Thanks.").

The window 306 is indicative of an instant message that was sent to the voice mail recipient. The user of the monitor 300 can send a command to the server 102 in order to retrieve a voice mail message converted into a text message, query the server 102 as to how many voice mail messages the user has, delete a voice mail message or instant message, find out how many converted voice mail messages the user has or the server 102 has stored for the user, reply to a voice mail message, or perform some other function.

The instant messaging system 104 may allow the user to send various commands. For example, sending the command "<next>" in an instant message to "Voice Mail" may cause the server 102 or the instant messaging system 104 to send a transcription or text file of the next unread voice mail message in the user's voice mail box in an instant message communication. Sending the command "<prev>" in an instant message to "Voice Mail" may cause the server 102 or the instant messaging system 104 to send a transcription or text file of the previous unread voice mail message in the user's voice mail box in an instant message communication. Sending the command "<?>" in an instant message to "Voice Mail" may cause the server 102 or the instant messaging system 104 to send an instant message communication indicative of the number of unread voice messages in the user's voice mail box. Sending the command "<del>" in an instant message to "Voice Mail" may cause the server 102 or the voice mail system to delete the current voice mail message in the user's voice mail box. Sending the command "<list>" in an instant message to "Voice Mail" may cause the server 102 or the instant messaging system 104 to send an instant message providing information or other data regarding one or more voice mail messages, such as, for example, the number of voice mail messages, when they were received, who or what telephone numbers the voice mail messages are from, how long the voice mail messages are, etc. Sending the command "<2>" to "Voice Mail" may cause the server 102 or the instant messaging system to send the transcription of the second voice mail message in a list of voice mail messages via an instant message communication.

In some embodiments, a user may be able to send a text message as part of an instant message communication to the server 102. The server 102 then may use the voice/text converter 108 to create an audio message. For example, sending the command "<reply[text]" may cause the server 102 to use the "[text]" portion of the command to create a audio message or electronic voice message. The server 102 then may send the audio or electronic voice message to the sender of the original voice mail message. For example, the server 102 may call the sender's telephone number and play an audio file or send the audio file as part of an email message or instant message to the sender. As another example, sending the command "<reply[text][identifier]>" may cause the server 102 to use the "[text]" portion of the command to create a audio message or electronic voice message that is sent to the party, telephone number, etc. indicated by the "[identifier]" portion of the command.

Server

Figure 11:
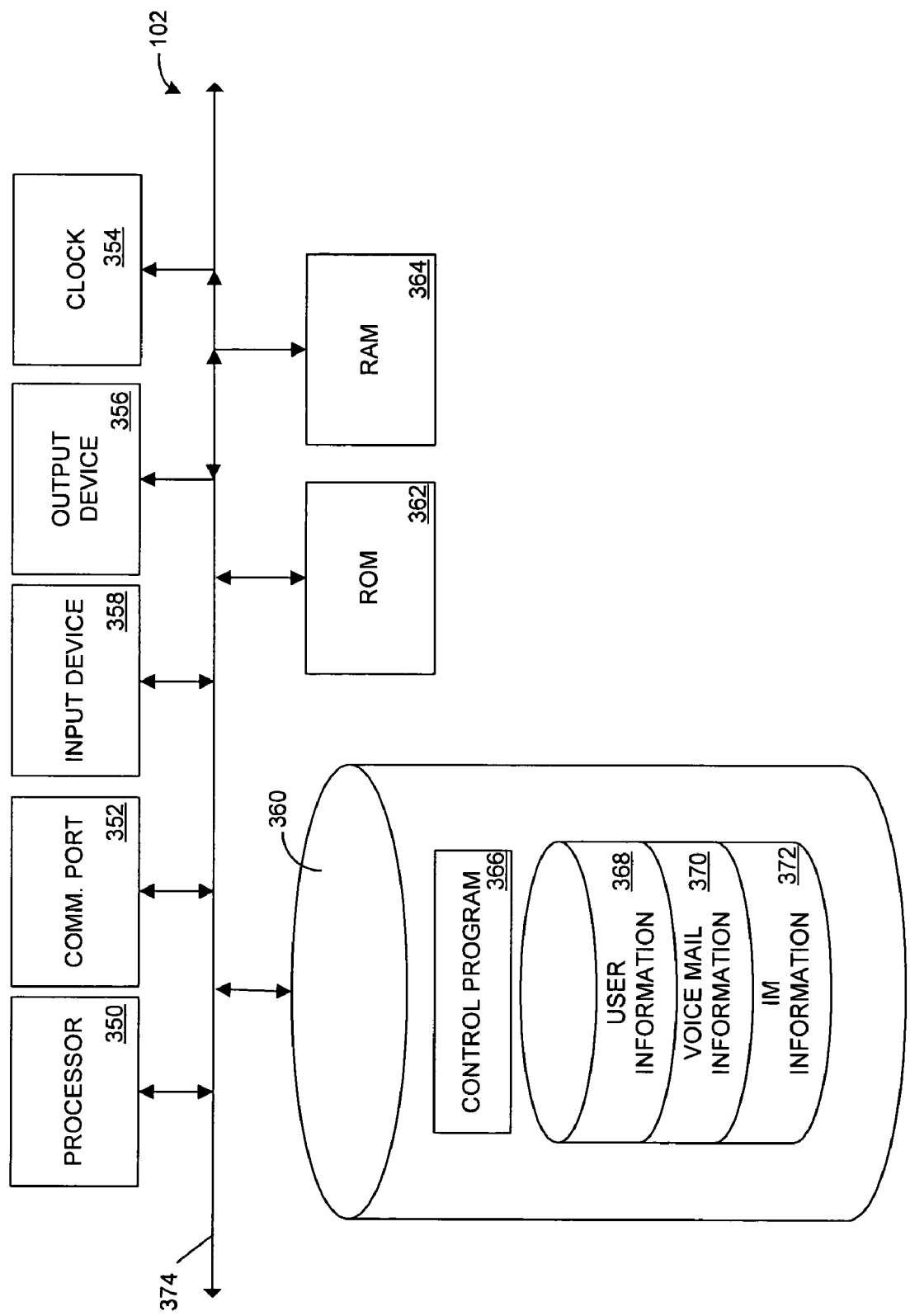
FIG. 11 is a block diagram of a server that may implement one or more of the components of FIG. 1 and/or one or more elements of the methods described herein.

Now referring to FIG. 11, a representative block diagram of a server or controller 102 is illustrated. As previously discussed above, the server 102 also may include the voice mail system 106, the instant messaging system 104, the voice/text converter 108, and/or the email system 164.

The server 102 can comprise a single device or computer, a networked set or group of devices or computers, a workstation, mainframe or host computer, etc. In some embodiments, the server 102 may implement one or more elements of the methods disclosed herein.

The server 102 may include a processor, microchip, central processing unit, or computer 350 that is in communication with or otherwise uses or includes one or more communication ports 352 for communicating with user devices and/or other devices. The processor may be operative or adapted to implement one or more of the elements of the methods disclosed herein. Communication ports may be adapted to connect to such elements as local area network adapters, wireless communication devices, Bluetooth technology, etc. The server 102 also may include an internal clock element 354 to maintain an accurate time and date for the server 102, create time stamps for communications received or sent by the server 102, etc.

If desired, the server 102 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 102 may include a memory or data storage device 360 to store information, software, databases, documents, communications, device drivers, etc. The memory or data storage device 360 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 102 also may include separate ROM 362 and RAM 364.

The processor 350 and the data storage device 360 in the server 102 each may be, for example: (i) located entirely within a single computer or other computing device; or (ii) connected to each other by a remote communication medium, such as a Local Area Network, serial port cable, telephone line or radio frequency transceiver. In one embodiment, the server 102 may comprise one or more computers that are connected over a Local Area Network to a remote server computer for maintaining databases.

A conventional personal computer or workstation with sufficient memory and processing capability may be used as the server 102. The server 102 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 350. Other or equivalent or other processors may be available from Motorola, Inc., AMD, or Sun Microsystems, Inc. The processor 350 also may comprise one or more microprocessors, computers, computer systems, etc.

Software may be resident and operating or operational on the server 102. The software may be stored on the data storage device 360 and may include a control program 366 for operating the server, databases, etc. The control program 366 may control the processor 350. The processor 350 preferably performs instructions of the control program 366, and thereby operates in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The server 102 also may include or store information regarding identities, user devices, contexts, mapping tables (such as telephone number to IP address conversion tables), communications, etc. For example, information regarding one or more users may be stored in a user information database 368 for use by the server 102 or another device or entity. Information regarding one or more voice mail messages may be stored in a voice mail information database 370 for use by the server 102 or another device or entity and information regarding one or more instant messages may be stored in an instant message information database 372 for use by the server 102 or another device or entity. In some embodiments, some or all of one or more of the databases may be stored or mirrored remotely from the server 102.

According to some embodiments, the instructions of the control program may be read into a main memory from another computer-readable medium, such as from storage device 360. Execution of sequences of the instructions in the control program causes the processor 350 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 374.

While specific implementations and hardware/software configurations for the server 102 have been illustrated, it should be noted that other implementations and hardware configurations are possible and that no specific implementation or hardware/software configuration is needed. Thus, not all of the components illustrated in FIG. 11 may be needed for the server 102 implementing the methods disclosed herein.

In some embodiments, an apparatus may include a processor; a communication port coupled to the processor and adapted to communicate with at least one device; and a storage device coupled to the processor and storing instructions adapted to be executed by the processor to receive a first voice mail message, the first voice mail message being associated with a recipient; convert the first voice mail message to an instant message; determine an instant message address associated with the recipient; and send the instant message to the address. In some other embodiments, an apparatus may include a processor; a communication port coupled to the processor and adapted to communicate with at least one device; and a storage device coupled to the processor and storing instructions adapted to be executed by the processor to receive a voice mail message, the voice mail message being associated with a recipient; convert the voice mail message into a text file; determine an instant message address associated with the recipient; and provide the text file and the address to an instant message system. In some additional embodiments, an apparatus may include a processor; a communication port coupled to the processor and adapted to communicate with at least one device; and a storage device coupled to the processor and storing instructions adapted to be executed by the processor to receive a voice mail message, the voice mail message being associated with a recipient; determine if the recipient is available to receive an instant message; convert the voice mail message to an email message if the recipient is not available to receive an instant message; determine an email address associated with the recipient; and send the instant message to the email address.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the embodiments described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although methods and systems have been described with respect to various embodiments thereof, those skilled in the art will note that various substitutions may be made to those embodiments described herein. The embodiments described in the above detailed description are not intended to be limited to the specific form set forth herein, but is intended to cover such alternatives, modifications and equivalents as can reasonably be included within the spirit and scope of the appended claims.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method, comprising:
receiving a first voice mail message, said first voice mail message being associated with a recipient of said first voicemail message;
converting said first voice mail message to a first instant message;
determining an instant message address associated with said recipient; and
sending said first instant message and said first voice mail message to said address of said recipient.

2. The method of claim 1, further comprising:
determining if said recipient is available to receive an instant message.

3. The method of claim 1, wherein said sending said first instant message to said address occurs only after determining that said recipient is available to receive an instant message.

4. The method of claim 1, further comprising:
receiving a command from said recipient regarding said first voice mail message.

5. The method of claim 1, further comprising:
receiving a command from said recipient regarding a second voice mail. message.

6. The method of claim 1, further comprising:
sending data indicative of a calling telephone number associated with said first voice mail message.

7. The method of claim 1, further comprising:
sending data indicative of said first voice mail message's length of time.

8. The method of claim 1, further comprising:
sending data indicative of a number of voice mail messages associated with said recipient.

9. The method of claim 1, further comprising:
converting said first voice mail message to an email message;
determining an email address associated with said recipient; and
sending said email message to said email address.

10. The method of claim 1, further comprising:
receiving a second instant message, said second instant message being indicative of a request for information regarding at least one voice mail message associated with said recipient.

11. The method of claim 1, further comprising:
receiving a second instant message, said second instant message including a text message.

12. The method of claim 11, further comprising:
converting said second instant message into a second voice mail message.

13. The method of claim 12, further comprising:
providing said second voice mail message to a party associated with said first voice mail message.

14. The method of claim 11, wherein said second instant message includes data indicative of a party and further comprising providing said second voice mail message to said party.

15. A computer readable medium having computer readable instructions stored thereon which, when executed by a computer, cause said computer to:
receive a first voice mail message, said first voice mail message being associated with a recipient of said first voicemail message;
convert said first voice mail message to an instant message;
determine an instant message address associated with said recipient; and
send said instant message and said first voice mail to said internet message address of said recipient.

16. An apparatus, comprising:
a processor;
a communication port coupled to said processor and adapted to communicate with at least one device; and a storage device coupled to said processor and storing instructions adapted to be executed by said processor to:

receive a first voice mail message, said first voice mail message being associated with a recipient of said first voicemail message;

convert said first voice mail message to an instant message;

determine an instant message address associated with said recipient; and send said instant message and said first voice mail to said instant message address of said recipient.

\* \* \* \* \*